(12) United States Patent
Hutchinson (10) Patent No.: US 11,358,336 B2
(45) Date of Patent: Jun. 14, 2022

(54) MACHINE FOR REMOVING SUBSTRATE MATERIAL FROM PARTS PRODUCED BY A 3-D PRINTER

(71) Applicant: PostProcess Technologies, Inc., Buffalo, NY (US)

(72) Inventor: Daniel J. Hutchinson, Orchard Park, NY (US)

(73) Assignee: PostProcess Technologies, Inc., Buffalo, NY (US)

( * ) Notice: Subject to any disclaimer, the term of this patent is extended or adjusted under 35 U.S.C. 154(b) by 346 days.

(21) Appl. No.: 15/597,069

(22) Filed: May 16, 2017

(65) Prior Publication Data

US 2018/0215096 A1   Aug. 2, 2018

Related U.S. Application Data

(60) Provisional application No. 62/337,038, filed on May 16, 2016.

(51) Int. Cl.
*B29C 64/35* (2017.01)
*B08B 3/12* (2006.01)
(Continued)

(52) U.S. Cl.
CPC .............. *B29C 64/35* (2017.08); *B08B 3/044* (2013.01); *B08B 3/12* (2013.01); *B08B 3/102* (2013.01); *B29C 64/40* (2017.08); *B33Y 30/00* (2014.12)

(58) Field of Classification Search
CPC .. B08B 3/12; B08B 3/044; B08B 7/00; B08B 7/04; B29C 71/0009; B29C 64/35
See application file for complete search history.

(56) References Cited

U.S. PATENT DOCUMENTS 3,863,657 A * 2/1975 Irving ................. A47L 15/0086
134/57 D
4,651,762 A    3/1987 Bowden
(Continued)

OTHER PUBLICATIONS

Model BW1020 General Specifications, Schlyer Machine, Jun. 3, 2013, US.
(Continued)

*Primary Examiner* — Joseph L. Perrin
*Assistant Examiner* — Kevin G Lee
(74) *Attorney, Agent, or Firm* — Lempia Summerfield Katz LLC (57) ABSTRACT

A machine for washing and removing substrate material for parts produced by a 3D printer. The machine includes a housing having a working chamber and a disposal chamber. The machine has at least one inlet in fluid communication with the working chamber. The disposal chamber is disposed adjacent to the working chamber. A dividing wall is disposed between the working chamber and the disposal chamber. A pump conveys a working fluid to the at least one inlet in the working chamber. The disposal chamber and the working chamber are disposed in fluid communication via a passageway such that working fluid passes from the working chamber to the disposal chamber. The machine may also include an ultrasonic generator for generating ultrasonic vibrations within the working chamber and a heater for warming the working fluid.

21 Claims, 7 Drawing Sheets

(51) Int. Cl.
*B08B 3/04* (2006.01)
*B29C 64/40* (2017.01)
*B33Y 30/00* (2015.01)
*B08B 3/10* (2006.01)

(56) References Cited

U.S. PATENT DOCUMENTS

| | | | | |
|---|---|---|---|---|
| 5,322,078 | A * | 6/1994 | Tuttle | B08B 3/006 |
| | | | | 134/104.4 |
| 5,470,465 | A | 11/1995 | Moorehead | |
| 5,499,643 | A | 3/1996 | Vincent, Jr. | |
| 5,927,309 | A * | 7/1999 | Hoover | A47L 15/241 |
| | | | | 134/195 |
| 6,289,530 | B1 * | 9/2001 | Miller | A47L 15/0086 |
| | | | | 134/102.1 |
| 6,568,409 | B1 * | 5/2003 | Fleck | B08B 3/006 |
| | | | | 134/110 |
| 7,475,698 | B2 * | 1/2009 | Bigott | A47L 15/0092 |
| | | | | 134/190 |
| 7,546,841 | B2 | 6/2009 | Tafoya | |
| 8,459,280 | B2 | 6/2013 | Swanson | |
| 8,636,850 | B2 | 1/2014 | Narovlyansky | |
| 2007/0163886 | A1 * | 7/2007 | Hara | C25D 13/22 |
| | | | | 204/622 |
| 2009/0241997 | A1 * | 10/2009 | Tafoya | B08B 3/045 |
| | | | | 134/34 |
| 2010/0170540 | A1 | 7/2010 | Kritchman | |
| 2010/0307544 | A1 | 12/2010 | Lele | |
| 2011/0186081 | A1 | 8/2011 | Dunn | |
| 2011/0197931 | A1 * | 8/2011 | Ng | B08B 3/102 |
| | | | | 134/104.4 |
| 2015/0209836 | A1 | 7/2015 | Dunn | |
| 2017/0348910 | A1 | 12/2017 | Hutchinson | |

OTHER PUBLICATIONS

Model CBW1026 Cage and Bottle Washer, Schlyer Machine, Jun. 7, 2013, US.
Techincal Drawing,, Model CBW 1026 LH Cage and Bottle Washer, Feb. 28, 2005, US.
Technical Drawing, Model BW1020 Bottle Washer, Nov. 8, 2013, US.
Technical Drawing, Model CBW 1026 RH Cage and Bottle Washer, Feb. 28, 2005, US.
Technical Drawing, Model CBW 1026C Cage and Bottle Washer, Feb. 28, 2005, US.
Technical Drawing, Model CBW1026L LH Cage and Bottle Washer, Feb. 28, 2005, US.
Technical Drawing, Model CBW1026LLS LH Cage and Bottle Washer, Feb. 28, 2005, US.
Technical Drawing, Model CBW1026LS LH Cage and Bottle Washer, Feb. 28, 2005, US.
Technical Drawing, Model CBW1026LS RH Cage and Bottle Washer, Feb. 28, 2005, US.
Technical Drawing, AS-3000 Wash-Rinse System Overall Views, Apr. 26, 2004.

* cited by examiner

MACHINE FOR REMOVING SUBSTRATE MATERIAL FROM PARTS PRODUCED BY A 3-D PRINTER

CROSS-REFERENCE TO RELATED APPLICATION

The present application claims priority benefit from U.S. Provisional Patent Application No. 62/337,038 entitled "Machine for Removing Substrate Material from Parts Produced by a 3-D Printer" filed May 16, 2016, which is incorporated herein by reference.

DESCRIPTION OF THE EMBODIMENT

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, debris, etc.) together with the specification, and are to be considered a portion of the entire written description of this invention. As used in the following description, the terms "horizontal", "vertical", "left", "right", "up" and "down", as well as adjectival and adverbial derivatives thereof, (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or of rotation, as appropriate.

Figure 1:
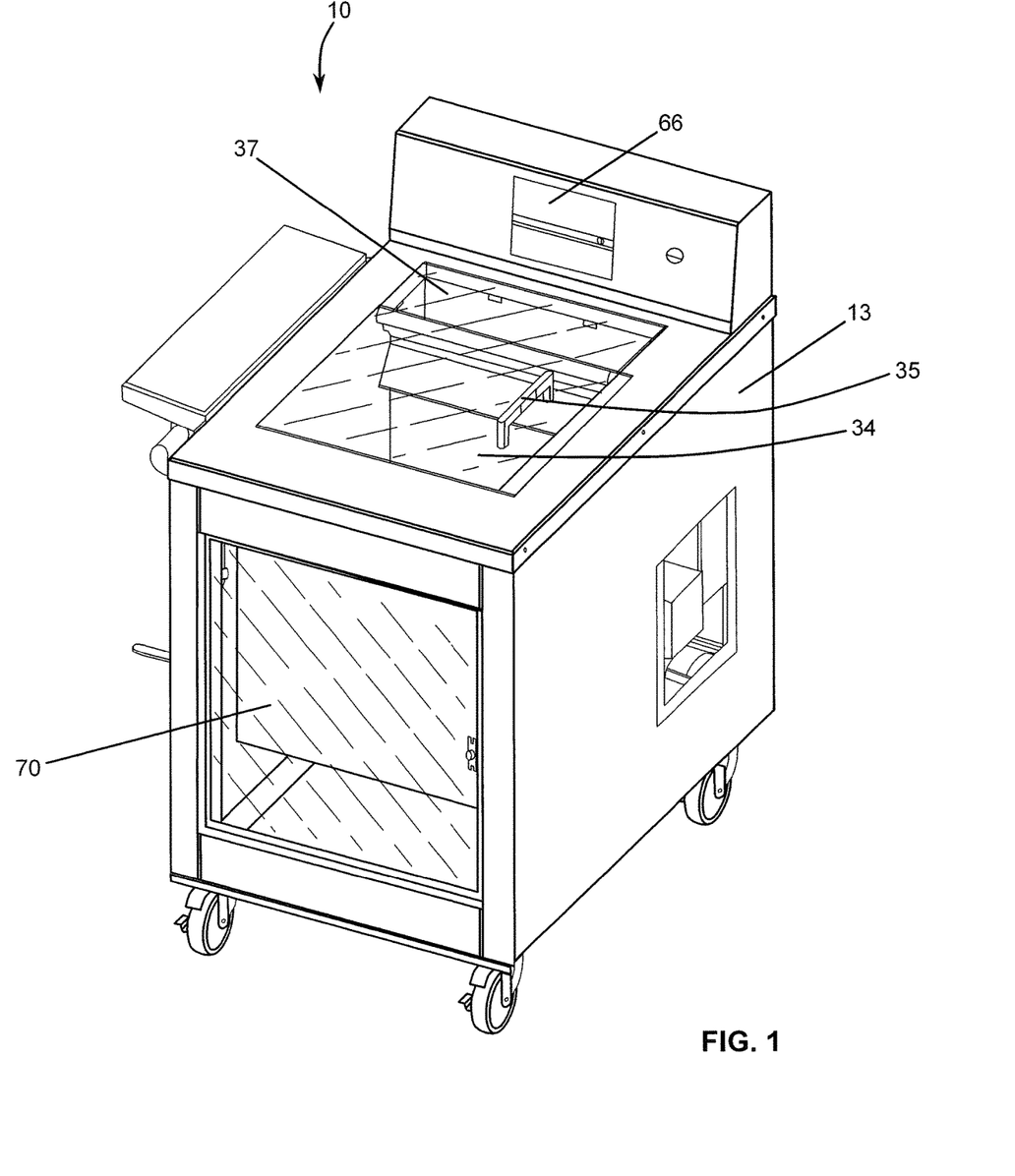
FIG. 1 is a front perspective view of a first embodiment of a machine for removing substrate material and for washing parts produced by a 3-D printer.
Figure 2:
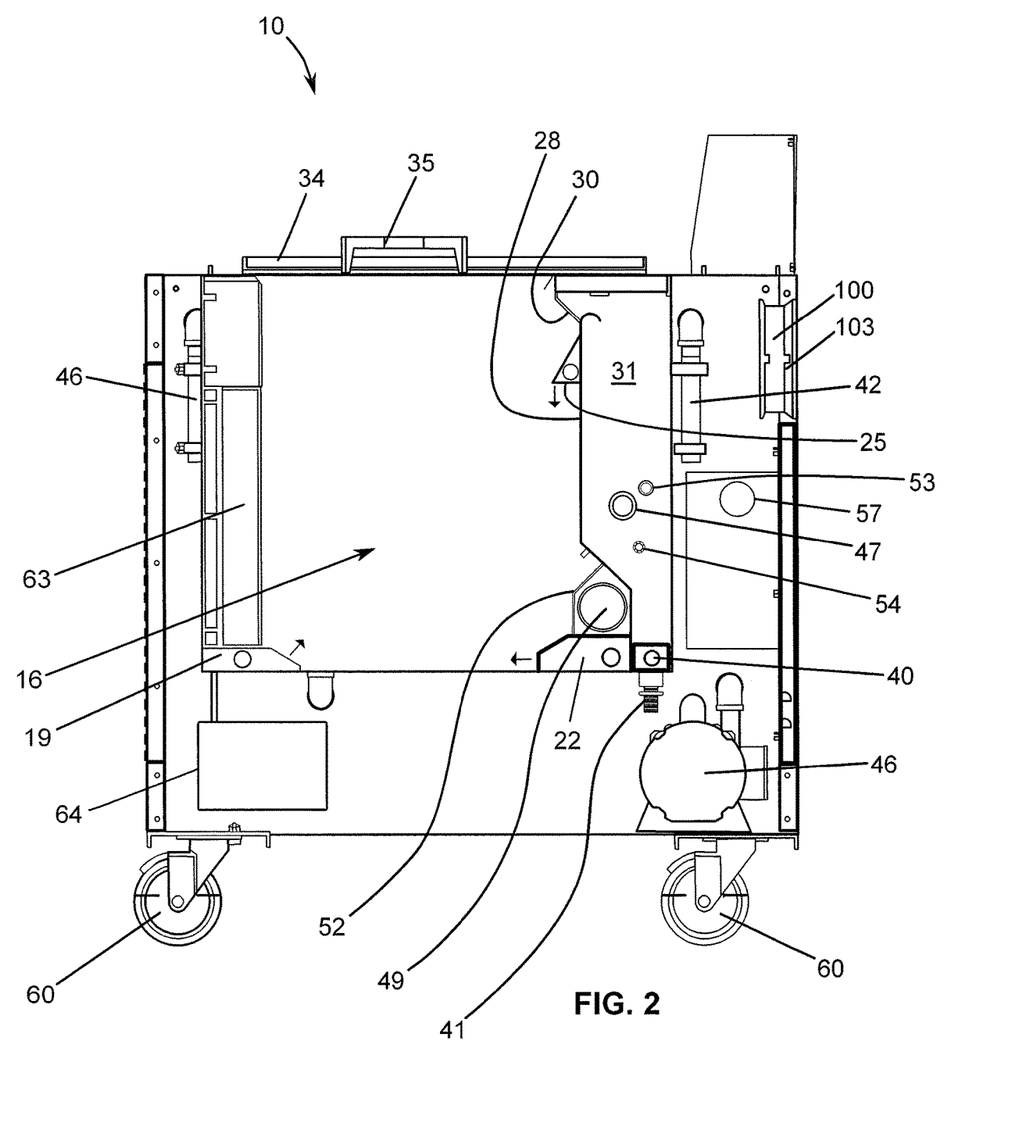
FIG. 2 is an internal cut-away view of the present invention.
Figure 3:
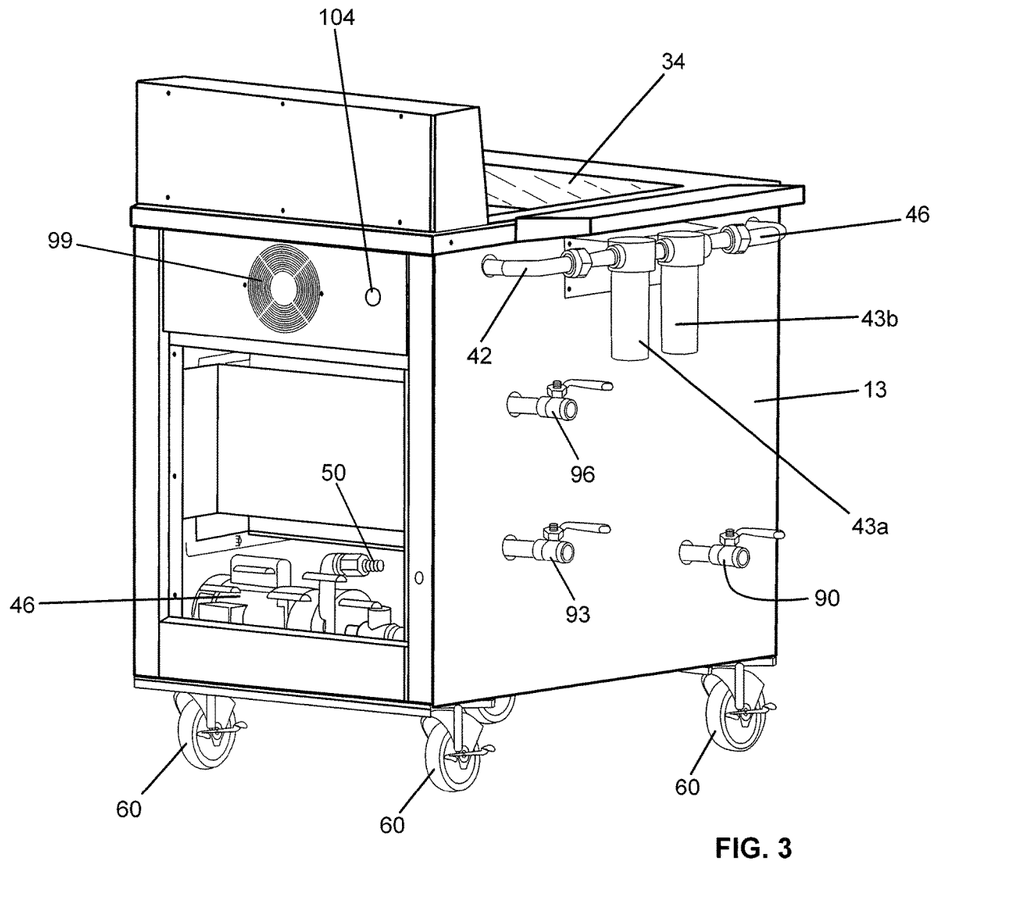
FIG. 3 is a rear perspective view of the machine of FIG. 1.

Referring generally to FIGS. 1-3, a part produced by a 3-D printer may include a scaffolding and/or substrate attached to the part after the printing process is completed. A finishing process is required to remove the scaffolding/substrate from the part. Also, parts produced by a 3-D printer may need to be washed. In FIG. 1, the present invention provides a machine 10 with a housing 13. Two chambers 16, 31 (FIG. 2) may be covered externally by removable/hinged lids 34, 37 respectively. Lid 34 may be provided with a handle 35 for easy access for loading the machine 10 with a 3-D part to be washed. The housing 13 may also be provided with an access door 70 that provides access to the parts of the housing 13 outside of the working chamber 16. At the top of the figure, computer control system 66 has a user interface located on the outside of the machine 10. The system 66 and the machine 10 may be powered by a 110V/60 Hz or 220V/60 Hz electricity source connected at electrical input 57 (FIG. 2).

Turning to FIG. 2, an opening or working chamber 16 is located in a middle portion of the housing 13. The working chamber 16 is filled with a fluid having a specific chemical composition for breakdown of a 3D printed substrate material. Multi-directional spray jets 19, 22, 25 for conveying fluid into the chamber 16 and for creating a turbulent flow inside the chamber 16 may be disposed around the inside perimeter of the working chamber 16. The spray jets 19, 22, 25 may be formed by a plurality of members having open areas for fluid to flow through. These open areas may be arranged to form a circular flow pattern inside the chamber 16. As shown spray jet 25 may be aimed downward, spray jet 22 may be aimed to the left and spray jet 19 may be aimed upward to generate a clockwise flow inside the working chamber 16. The working chamber 16 is also bordered by a dividing wall 28 that separates the working chamber 16 from a disposal chamber 31. The passageway over the dividing wall 28 is provided with an angled, perforated member 30. The perforated member 30 has openings large enough for the fluid and some smaller debris to pass through but blocks larger pieces of the scaffolding/substrate debris from entering chamber 31 to prevent these larger pieces from causing clogging problems. The larger pieces are thereby retained in the working chamber 16 until they dissolve to a point where they can pass through the perforated member 30.

The fluid within the working chamber 16 flows over the dividing wall 28 into the disposal chamber 31 carrying smaller debris isolating the smaller debris from the working chamber 16. Once fluid containing smaller debris passes into the disposal chamber 31 it flows through a debris strainer 40. From the debris strainer 40, the remaining fluid passes through outlet 41 into a conduit (not shown) that leads to the intake 50 (FIG. 3) of the pump 46. The pump 46 then conveys the fluid exiting the disposal chamber 31 through line 42 into a filtration system 43a, 43b. Filter 43a may provide a pre-filter stage with coarser screening followed by a finer filtration occurring in filter 43b. Once the fluid has passed through the filtration system 43a, 43b it flows back into the working chamber 16 through line 46 into spray headers 19, 22, 25. A level switch 47 disposed inside the chamber 31 provides for controlling the level of fluid in the disposal chamber 31. The disposal chamber 31 is also provided with an access port 54 for sensors such as thermocouples, ph detectors, or the like. An overflow port 53 provides for removing excess working fluid from the disposal chamber 31 when a large part displaces too much fluid inside the working chamber 16 causing the disposal chamber 31 to overflow.

While the fluid is circulated within the machine 10, the fluid may also be heated by an heating element 49 which is housed behind a guard 52 within the working chamber 16. This heating element 49 is used to maintain the user set temperature. The heating element 49 may be powered by electrical energy or other suitable power source.

Mounted on the interior wall of the working chamber 16 is an ultrasonic submersible pack 63. An ultrasonic generator 64 may be located within the housing 13 beneath the working chamber 16. The ultrasonic submersible 63 is used to break away substrate material while the 3D printed parts are circulating within the working chamber 16.

Accordingly, the combination of mechanical fluid flow, chemical reaction with the working fluid, heat, and ultrasonic vibration may all be combined in the working chamber 16 to remove the substrate/scaffolding from the 3-D printed part.

Turning to FIG. 3, a plurality of ports 90, 93, and 96 may be provided with ball valves. Port 90 provides access to the working chamber 16 for draining or the like. Port 93 provides access to the disposal chamber 31 for draining or the like, and port 96 is in fluid communication with the overflow port 53 to remove excess fluid from the disposal chamber 31. A grate 99 covers the intake for cooling fans 100 and 103 that provide for cooling a computer control system 66. An on/off switch 104 may be located at the back of the machine 10.

In operation, the lid 34 is opened and a part produced by a 3-D printer is inserted into the working chamber 16 for washing, and/or removal of a substrate/scaffold. The lid 34 is closed and a wash/rinse cycle is initiated via the computer control system 66. The control system 66 provides for customizable wash cycles. The control system includes a PLC controller with a HMI touchscreen. The part may be subject to numerous different conditions including controllable temperature, ultrasonic intensity, and water agitation intensity. The wash cycles may all include a high temperature, washing fluid containing chemicals for removing/dissolving the substrate. The control system 66 may also include a wired or wireless remote connection to a building automation system for remote control of the machine.

The system may also include the following features. The system may be provided with submerged high pressure jets. The system may be provided with submerged ultrasonic agitation. The jets/pump/ultrasonic generator may all be computer controlled on a varied basis. The system may provide for submersion part tumbling. An electronic heating element may be provided. Automatic temperature control for the chamber and the working fluid may be provided. The system may be computer controlled with user programmable cycles (e.g. time, intensity of agitation, temperature). The system may be provided with touch screen HMI. The system may be provided with safety features such as an emergency stop mushroom button, high temperature warnings, a float switch, an overflow drain, and a debris screen at the pump inlet. The system may be provided with swivel casters with a brake and a leveling feature. The system may include a manual fill and drain. The system may also include dual stage filtration. The system may use 110V/60 Hz or 220V/60 Hz electrical service. The lid may be hinged. The sump may be insulated. The system may be controlled by a microprocessor. The machine may be constructed with stainless steel. The exterior of the machine may be powder coated. There may be a split sump for substrate removal and isolation. The machine may include an easily removable parts basket.

Figure 4:
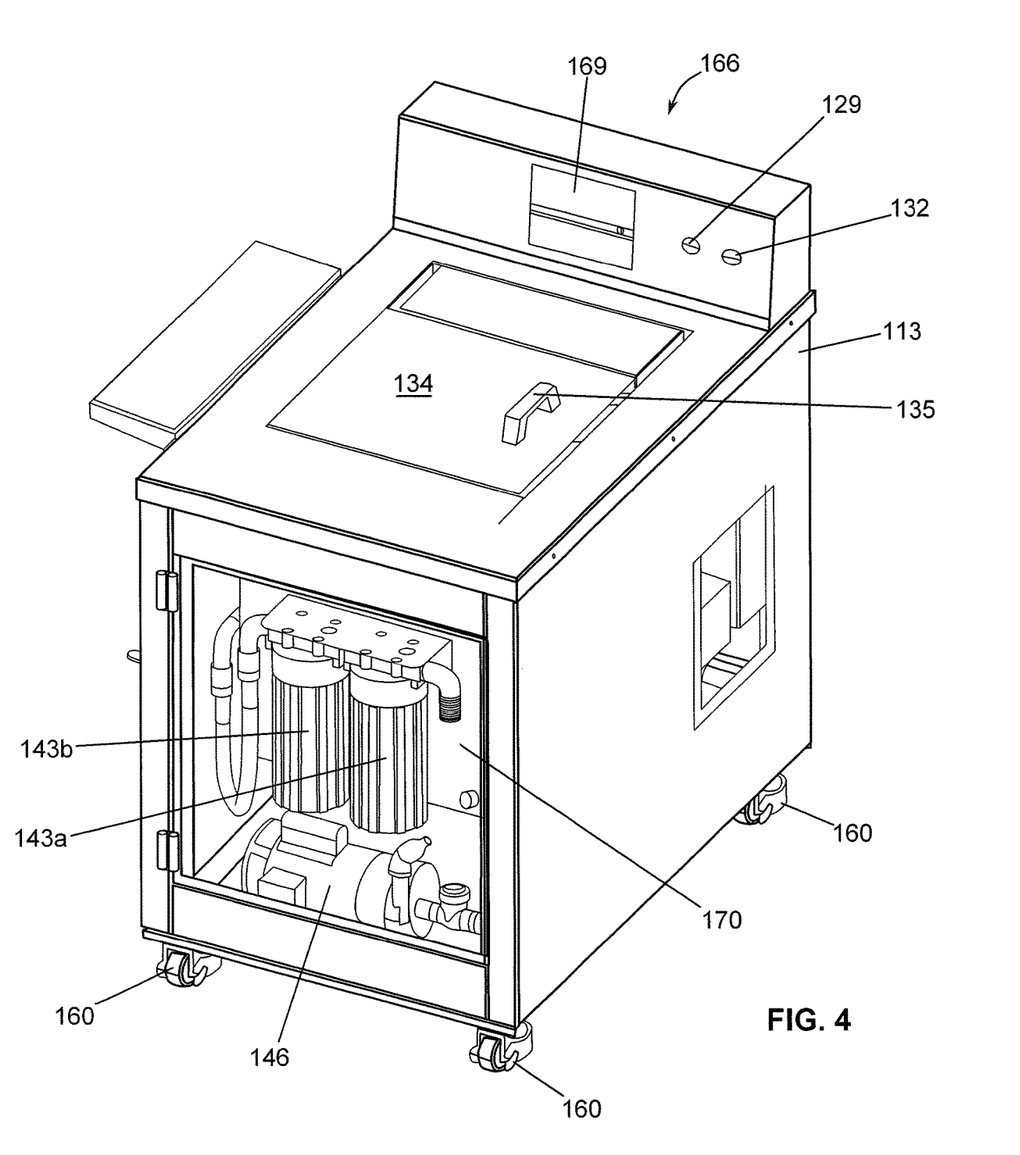
FIG. 4 is a front perspective view of a second embodiment of a machine for removing substrate material and for washing parts produced by a 3-D printer

Referring generally to FIGS. 4-7 and initially to FIG. 4, in a second embodiment of the invention a machine 100 has a housing 113. Two chambers 116, 131 (FIG. 5) may be covered externally by a removable/hinged lid 134. Lid 134 may be provided with a handle 135 for easy access for loading the machine 100 with a 3-D part to be washed. The housing 113 may also be provided with an access door 170 that provides access to the parts of the housing 113 outside of the working chamber 116. At the top of the figure, computer control system 166 has a user interface 169 located on the outside of the machine 100. An emergency stop button 129 and an on/off switch 132 may also be provided at the top of the machine 100 to the right of the user interface 169. A pump 146 may be located inside the door 170 at the front of the machine 100. Also, a filtration system 143*a*, 143*b* may be disposed inside the door 170 at the front of the machine 100. Filter 143*a* may provide a pre-filter stage with coarser screening followed by a finer filtration occurring in filter 143*b*.

Figure 5:
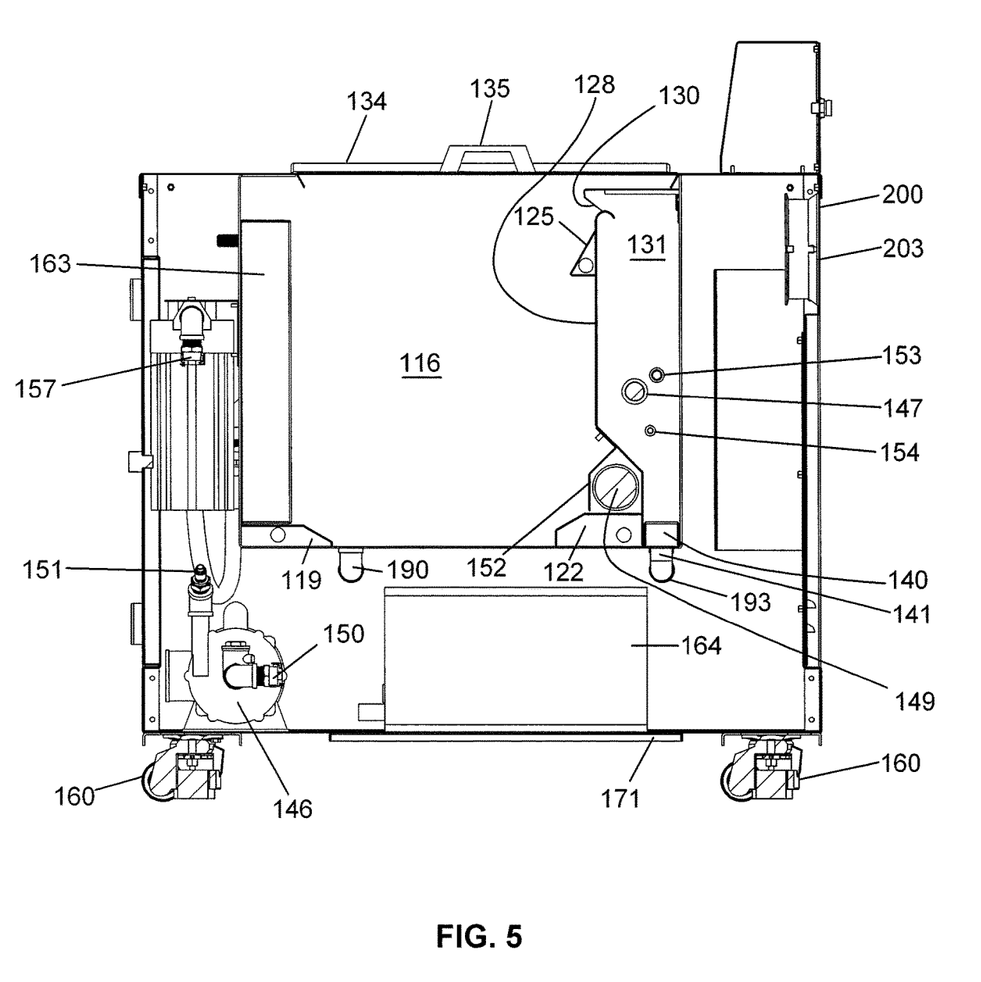
FIG. 5 is a cut-away right hand side view of the machine shown in FIG. 4.

Turning to FIG. 5, an opening or working chamber 116 is located in a middle portion of the housing 113. The working chamber 116 is filled with a fluid having a specific chemical composition for breakdown of a 3D printed substrate material. Multi-directional spray jets 119, 122, 125 for conveying fluid into the chamber 116 and for creating a turbulent flow inside the chamber 116 may be disposed around the inside perimeter of the working chamber 116. The spray jets 119, 122, 125 may be formed by a plurality of members having open areas for fluid to flow through. These open areas may be arranged to form a circular flow pattern inside the chamber 116. As shown spray jet 125 may be aimed downward, spray jet 122 may be aimed to the left and spray jet 119 may be aimed upward to generate a clockwise flow inside the working chamber 116. The working chamber 116 is also bordered by a dividing wall 128 that separates the working chamber 116 from a disposal chamber 131. The passageway over the dividing wall 128 is provided with an angled, perforated member 130. The perforated member 130 has openings large enough for the fluid and some smaller debris to pass through but blocks larger pieces of the scaffolding/substrate debris from entering chamber 131 to prevent these larger pieces from causing clogging problems. The larger pieces are thereby retained in the working chamber 116 until they dissolve to a point where they can pass through the perforated member 130. A removable access panel 171 may be provided at the bottom of the machine 100 for providing access to the ultrasonic generator 164.

The fluid within the working chamber 116 flows over the dividing wall 128 into the disposal chamber 131 carrying smaller debris isolating the smaller debris from the working chamber 116. Once fluid containing smaller debris passes into the disposal chamber 131 it flows through a debris strainer 140. From the debris strainer 140, the remaining fluid passes through outlet 141 into a conduit (not shown) that leads to the intake 150 of the pump 146. The pump 146 then conveys the fluid exiting the disposal chamber 131 from the pump outlet 151 through a conduit (not shown) into an inlet 157 for the filtration system 143*a*, 143*b*.

Figure 6:
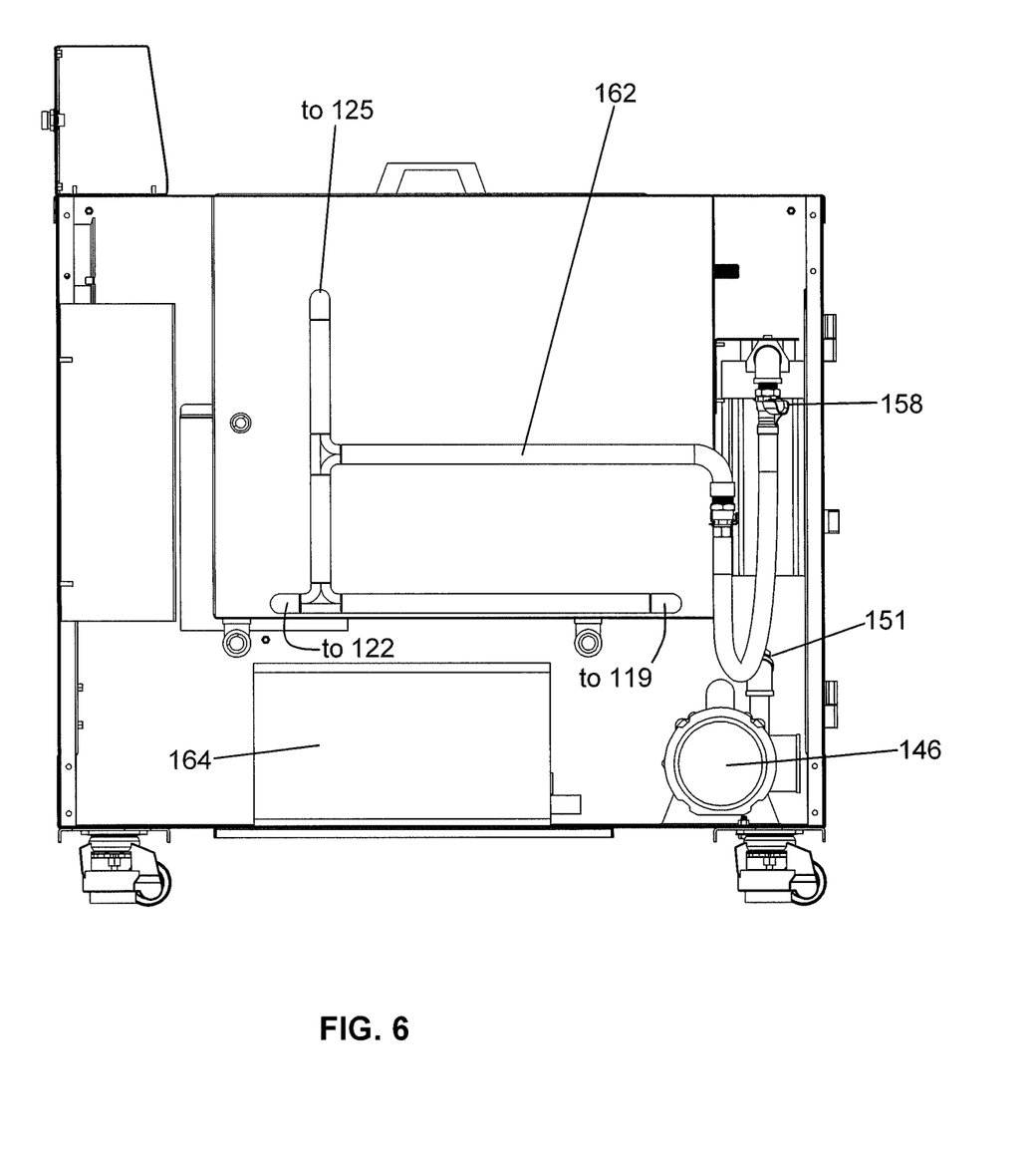
FIG. 6 is a cut-away left hand side view of the machine shown in FIG. 4.

Turning to FIG. 6, once the fluid has passed through the filtration system 143*a*, 143*b* it passes through outlet 158 and flows back into the working chamber 116 through line 162 into spray headers 119, 122, 125. A level switch 147 disposed inside the chamber 131 provides for controlling the level of fluid in the disposal chamber 131. The disposal chamber 131 is also provided with an access port 154 for sensors such as thermocouples, ph detectors, or the like. An overflow port 153 provides for removing excess working fluid from the disposal chamber 131 when a large part displaces too much fluid inside the working chamber 116 causing the disposal chamber 131 to overflow.

The machine 100 may be provided with an automatic filling option such that when an oversize part is removed, the working chamber 116 will automatically refill until the level switch 147 detects the correct level of fluid inside the machine 100.

While the fluid is circulated within the machine 100, the fluid may also be heated by an heating element 149 which is housed behind a guard 152 within the working chamber 116. This heating element 149 is used to maintain the user set temperature. The heating element 149 may be powered by electrical energy or other suitable power source.

Mounted on the interior wall of the working chamber 116 is an ultrasonic submersible pack 163. An ultrasonic generator 164 may be located within the housing 113 beneath the working chamber 116. The ultrasonic submersible 163 is used to break away substrate material while the 3D printed parts are circulating within the working chamber 116.

Accordingly, the combination of mechanical fluid flow, chemical reaction with the working fluid, heat, and ultrasonic vibration may all be combined in the working chamber 116 to remove the substrate/scaffolding from the 3-D printed part.

Figure 7:
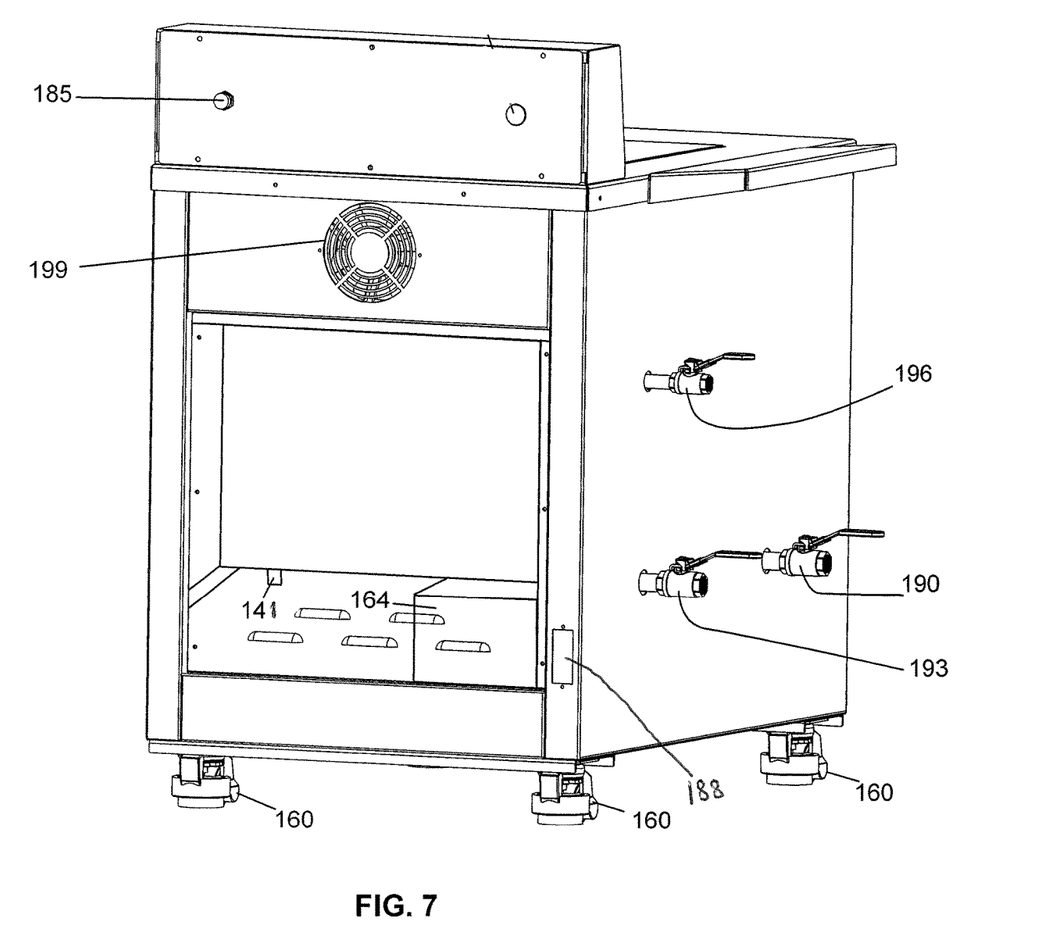
FIG. 7 is a rear perspective view of the machine of FIG. 4.

Turning to FIG. 7, a plurality of ports 190, 193, and 196 may be provided with ball valves. Port 190 provides access to the working chamber 116 for draining or the like. Port 193 provides access to the disposal chamber 131 for draining or the like, and port 196 is in fluid communication with the overflow port 153 to remove excess fluid from the disposal chamber 131. A grate 199 covers the intake for cooling fans 200 and 203 that provide for cooling a computer control system 166.

In operation, the lid 134 is opened and a part produced by a 3-D printer is inserted into the working chamber 116 for washing, and/or removal of a substrate/scaffold. The lid 134 is closed and a wash/rinse cycle is initiated via the computer control system 166. The control system 166 provides for customizable wash cycles. The control system includes a PLC controller with a HMI touchscreen. The part may be subject to numerous different conditions including controllable temperature, ultrasonic intensity, and water agitation intensity. The wash cycles may all include a high temperature, washing fluid containing chemicals for removing/dissolving the substrate. The control system 166 may also include a wired or wireless remote connection to a building automation system for remote control of the machine. As shown in FIG. 7, the machine 100 may be provided with an Ethernet port 185 and a power cord receptacle 188 for plugging in a power cord (not shown).

The present invention contemplates that many changes and modifications may be made. Therefore, while the presently-preferred form of the machine has been shown and described, and several modifications and alternatives discussed, persons skilled in this art will readily appreciate that various additional changes and modifications may be made without departing from the spirit of the invention, as defined and differentiated by the following claims.

What is claimed is:

1. A machine for washing and removing substrate material for parts produced by a 3D printer, the machine comprising:
   a housing;
   a working chamber disposed in the housing;
   at least one multi-directional inlet in fluid communication with the working chamber, the multi-directional inlet configured and arranged to provide a circular flow path for a working fluid to remove substrate material from a part in the working chamber, wherein the at least one multi-directional inlet comprises a downwardly aimed spray jet and an upwardly aimed spray jet, wherein said upwardly aimed spray jet is mounted at an angle with respect to a vertical axis;
   a disposal chamber disposed adjacent to the working chamber;
   a dividing wall disposed between the working chamber and the disposal chamber;
   a member located at a top of the dividing wall and having a surface with openings of a size large enough to allow the working fluid to pass through but that block pieces of removed substrate material larger than the size of the openings, wherein said member is located and mounted at an angle such that the surface of the member is perpendicular to a direction of flow from the upwardly aimed spray jet so that the pieces of removed substrate material larger than the size of the openings are retained in the working chamber; and
   a pump for conveying the working fluid to the at least one multi-directional inlet;
   wherein the disposal chamber and the working chamber are disposed in fluid communication over the dividing wall such that the working fluid passes from the working chamber to the disposal chamber, and further wherein said spray jet aimed downward is located adjacent to the top of the dividing wall.

2. The machine of claim 1, wherein the at least one multi-directional inlet further comprises a plurality of multi-directional spray jets disposed in spaced apart relation to generate a turbulent flow pattern for the working fluid in the chamber.

3. The machine of claim 2, wherein the plurality of multi-directional spray jets are disposed around the perimeter of the working chamber.

4. The machine of claim 1, wherein the working chamber is covered by a lid.

5. The machine of claim 1, further comprising a debris strainer at an outlet in the disposal chamber.

6. The machine of claim 5, further comprising a conduit disposed in fluid communication between the outlet of the disposal chamber and an intake of the pump.

7. The machine of claim 1, further comprising a filtration system disposed between the pump and the working chamber.

8. The machine of claim 1, further comprising an ultrasonic generator disposed in the housing to generate ultrasonic vibration in the working chamber.

9. The machine of claim 1, further comprising a heating element for heating the working fluid in the working chamber.

10. The machine of claim 1, wherein the working fluid includes a chemical agent having a chemical composition effective for breaking down the substrate material.

11. The machine of claim 1, wherein the pump conveys filtered working fluid from the disposal chamber back to the working chamber.

12. A machine for washing and removing substrate material for parts produced by a 3D printer, the machine comprising:
   a housing;
   a working chamber disposed in the housing;
   a multi-directional plurality of inlets in fluid communication with the working chamber, the multi-directional plurality of inlets comprising at least an upwardly aimed spray jet, a downwardly aimed spray jet located on a wall opposite the upwardly aimed spray jet, and a horizontally aimed spray jet, the multi-directional plurality of inlets adapted to provide a circular flow path curved around a horizontal axis for a working fluid to remove substrate material in the working chamber;
   a disposal chamber adjacent to the working chamber;
   a pump for conveying a working fluid to the at least one multi-directional plurality of inlets; and
   a passageway having a member that provides a surface having at least one opening to the passageway for the working fluid to pass from the working chamber to the disposal chamber, wherein a cross section of the passageway is substantially parallel to a tangent of the circular flow path, and wherein the upwardly aimed spray jet is aimed at an angle such that a flow from an outlet of the upwardly aimed spray jet is perpendicular to the surface of said member to provide a flow of the working fluid upward within the working chamber and through the passageway into the disposal chamber.

13. The machine of claim 12, wherein the wall is located between the working chamber and the disposal chamber.

14. The machine of claim 13, wherein the multi-directional plurality of inlets are disposed around the perimeter of the working chamber.

15. The machine of claim 12, wherein the working chamber is covered by a lid.

16. The machine of claim 12, wherein the member comprises a debris strainer at an outlet in the disposal chamber.

17. The machine of claim 16, further comprising a conduit disposed in fluid communication between the outlet of the disposal chamber and an intake of the pump.

18. The machine of claim 12, further comprising a filtration system disposed between the pump and the working chamber.

19. The machine of claim 12, wherein the pump conveys filtered working fluid from the disposal chamber back to the working chamber.

20. A machine for washing and removing substrate material for parts produced by a 3D printer, the machine comprising:
- a housing;
- a working chamber disposed in the housing;
- at least one multi-directional inlet in fluid communication with the working chamber, the at least one multi-directional inlet comprising at least an upwardly aimed spray jet, a downwardly aimed spray jet located on a wall opposite the upwardly aimed spray jet, and a horizontally aimed spray jet, the at least one multi-directional inlet configured and arranged to provide a circular flow path for a working fluid to remove substrate material from a part in the working chamber, wherein the circular flow path is curved around a horizontal axis;
- a disposal chamber;
- a pump for conveying a working fluid to the at least one inlet;
- a passageway over a dividing wall for providing fluid communication between the working chamber and the disposal chamber, a cross section of the passageway being substantially parallel to a tangent of the circular flow path, and
- a member mounted in said passageway having a surface located above at least one of the at least one inlet and with an opening sized to prevent particles of substrate material from passing over said passageway, wherein said member is mounted at an angle such that the surface of the member is perpendicular to a direction of flow from at least one of the at least one multi-directional inlet.

21. The machine of claim 20, wherein the passageway is defined along a path over the wall opposite the upwardly aimed spray jet.

* * * * *